Jan. 7, 1941.  E. T. LINDEROTH  2,227,836
REGENERATIVE OR RECUPERATIVE HEAT EXCHANGING APPARATUS
Filed May 10, 1938
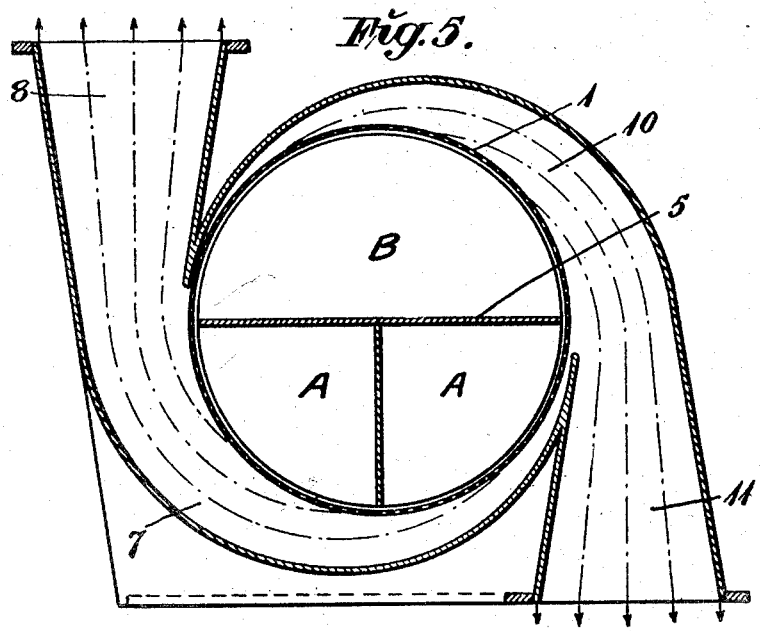
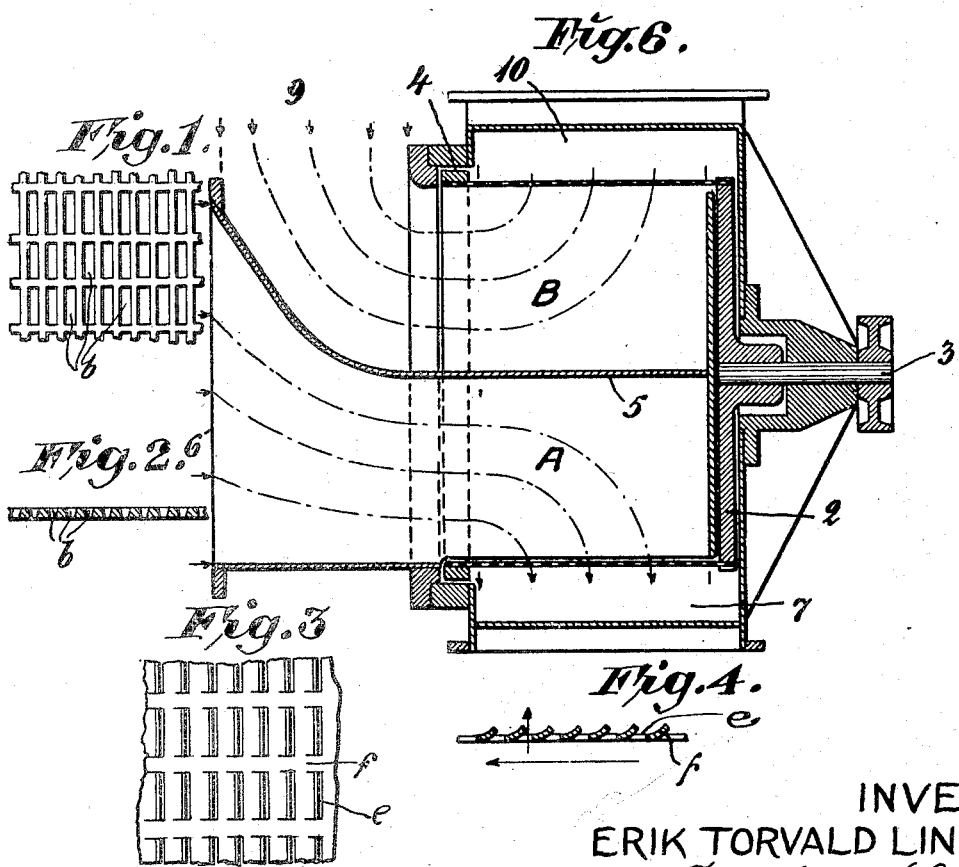
INVENTOR:
ERIK TORVALD LINDEROTH
BY Haseltine, Lake & Co.
ATTORNEYS

UNITED STATES PATENT OFFICE 2,227,836

REGENERATIVE OR RECUPERATIVE HEAT EXCHANGING APPARATUS

Erik Torvald Linderoth, Enkoping, Sweden

Application May 10, 1938, Serial No. 206,995
In Sweden May 12, 1937

4 Claims. (Cl. 257—6)

The present invention relates to regenerative heat exchanging apparatus for exchanging heat between gases which are provided with a rotary heat exchanger in which passages for the flow of gas and/or air are provided.

The object of the invention is to adapt the rotary heat exchanger and its passages in such a way that in comparison with the hitherto known apparatus the following advantages are obtained:

(1) Highly improved heat transmission.
(2) Considerably lowered weight of the rotary heat exchanger.
(3) Increased peripheral velocity due to the lowered weight, with accompanying improved efficiency of heat transmission.
(4) Lower cost of manufacture.

The invention is founded upon the fact that the cross-section of the passages of flow of the rotary heat exchanger shall be so narrow that at undisturbed inlet of gas or air into such passages a laminar flow would be obtained, and that the passages of flow at the same time are so short that the turbulence caused by the disturbance at the inlet of the gas or air into the rotating passages cannot be subdued during the flow through the passages.

An object of the present invention consists in determining maximum limits for the width or the cross-sectional area of the passages and for the length of the passages in such rotating heat-exchangers, which limits must not be surpassed if the intentioned favourable conditions of flow are to be obtained.

By means of thorough tests made it has now been set forth that in order to reach the above mentioned favourable conditions of flow, the cross-section of the passages must be such that its hydraulic radius does not exceed ¾–1 mm., when the hydraulic radius is the quotient of the cross-sectional area of the passage and the perimeter of the cross-section, and that at the same time the length of the passages in the direction of flow must not exceed 50 times the hydraulic radius of the cross-section of the passages, if the turbulence caused by the disturbance at the inflow of gas or air is to continue through the whole passage in a sufficient degree.

If the length of the passages is as short as 25 times the hydraulic radius, a very good rate of heat transmission will be obtained.

The use of so narrow passage sections that the hydraulic radius is 0.5 mm. or less would alone at a purely laminar flow bring about a considerably improved technical effect, which is further improved by making the passages of such a short length that the turbulence arising at the inlet of the rotating passages cannot be subdued during the flow through the passages, whereby the rate of heat transmission is further considerably increased.

It has been found, however, that at very small hydraulic radii, such as 0.25 mm. and less, the turbulent flow produced by the disturbance at the inlet very rapidly passes into a purely laminar flow. To obtain the best possible effect the length of passage, therefore, should in such a case preferably not be made greater than 10–15 times the hydraulic radius. If required, the heating surface is then divided into two or more layers of elements provided with still shorter passages (such as 5 times the hydraulic radius), said elements being arranged behind one another in the direction of flow of the gas.

The present invention has further for its object to provide suitable forms of embodiment of a rotating heat exchanger provided with passages of flow of the above described type.

According to the invention, the rotating heat exchanger is preferably made from perforated sheet metal formed by providing apertures lying close to each other in sheet metal. The rotating heat exchanger may also be constructed in many other ways while taking care that the conditions set up for the dimensions of the passages are fulfilled, as will be described more closely hereinafter.

The rotary heat exchanger may be formed as a cylinder or other suitable body of revolution with a radial flow of the gaseous media. They may obviously also be made in a disc-like fashion for axial flow.

A pair of practical embodiments of materials out of which a rotating heat exchanger according to the invention may be constructed, are diagrammatically shown in Figs. 1–4 on the accompanying drawing.

Figs. 1 and 2 are a plan view and a cross section respectively of a material consisting of perforated sheet metal produced by the provision of a number of apertures $b$ lying close to each other in a metal sheet, said apertures forming passages of flow, between which only narrow strips of material remain.

Figs. 3 and 4 are a plan view and a cross section respectively of another suitable material consisting of perforated sheet metal, in which the perforations have been so made that no material need to be removed from the plate, whereby the heating surface of the latter need not be reduced, but will even be increased in some measure, $e$ denotes the passages of flow, and *f* denotes cut out and bent out portions between the passages *e*. If the material is bent to cylindrical shape and used as a rotating heat exchanger the bent out portions *f* may act as fan blades for propelling the air or gas.

To make a rotating cylindrical heat exchanger produce the best possible fan effect, the thickness of the sheet metal plate, however, should be as great as possible in relation to the width of the passages and be at least ¼ but if possible one half of the smallest distance between the passage walls.

In a perforated sheet metal used for making the heat exchanger, the resistance to flow may be reduced by bending out portions of the sheet metal between the perforations as shown in Figs. 5 and 6.

By making the rotating heat exchanger from material of the above described kind, it will be possible to reduce the weight of the rotor to a very small fraction of the weight of the older constructions. Therefore it will also be possible to considerably increase the velocity of rotation.

The high velocity of rotation aimed at according to the invention, is an efficient means to produce the disturbance of the gas current at the inlet of the narrow passages which is necessary to realize the aforementioned advantages connected with narrow passages. In passages as narrow as proposed according to the invention, a particularly effective disturbance of the gas current at the inlet of the passages is necessary if a fully developed state of turbulence is to be reached.

In order that the effect of the rotation of the heat exchanger should have the aforementioned influence, it is above all necessary that the peripheral velocity of the passages is greater than the inlet velocity of the gas in the passages. However, tests made have proved that said peripheral velocity should at least amount to 2-3 times the velocity of flow of the gas in the passages. The velocity of flow has then been assumed to be the same as in the ordinary known heat exchangers for the intended purpose. This corresponds to a peripheral velocity of about 10-15 metres a second.

Such high peripheral velocity, however, requires a considerable energy consumption. In order that this circumstance should not be disadvantageous, the rotating heat exchanger should suitably be so adapted that it simultaneously acts as a fan for the gases to be heated or cooled respectively. A part of the energy necessary to rotate the heat exchanger will thus be made useful for fan propulsion, and only so much energy will be lost as is necessary to generate the turbulence of the flow. By utilizing the used energy in the described way, it will be economically possible to use a peripheral velocity of the heat exchanger of 20-25 m/s, at the same time as the width of the passages is reduced far below the ordinary measures hitherto used.

The relation between the peripheral velocity and the velocity of flow has, however, in connection with short passages an effect not yet mentioned. A high velocity of flow has since long ago been known as a means for increasing the state of turbulence in heat exchanging apparatus. A high velocity of flow involves, however, a greater length of the passages of flow if the gas shall have enough time to be heated or cooled to the same temperature as when a moderate velocity of flow is used. According to the present invention the velocity of flow in the passages should be comparatively low. In spite of this the speedy rotation of the heat exchanger effects a state of turbulence which corresponds to a high value of the velocity of flow. This is a cooperating reason why it will be possible to use so short passages in relation to the passage section as stated above, and still obtain a sufficiently great change of temperature of the gases flowing through the heat exchanger. This effect will be most prominent if the heating surface of the rotating heat exchanger is shaped and arranged in the above suggested manner so that the turbulence is generated not only by friction against the heating surface but also to a considerable part by collision with edges or side surfaces extending transversely to the direction of rotation. As for these reasons the elements or surfaces extending transversely to direction of rotation are the most efficient ones with regard to the heat transmission, the material in the rotary heat exchanger should consist of the greatest possible number of such elements or surfaces.

Figs. 5 and 6 show a cross-section and a longitudinal section respectively through a regenerative air preheater provided with a cylindrical rotating heat exchanger according to the invention. The invention does not, however, relate to the various constructive details of the disclosed air preheater which is illustrated only to disclose one of the various uses of the invention.

In the apparatus according to Figs. 5 and 6, 1 designates the rotating cylindrical heat exchanger which is made from one of the above described embodiments of sheet metal material, the passages or meshes of which have dimensions falling within the above stated limits. The rotor 1 is at one end supported by a disc-formed wheel 2 which is pivotally journalled in the casing of the preheater by means of the shaft 3. At the opposite end the rotor is reinforced by a ring 4 mounted on its outside. The interior of the rotor is divided in two spaces A and B by a stationary partition 5, the space A being intended for the hot gases (flue gases) and the space B for the air to be heated. The hot gases are supplied to the space A from the connecting branch 6, then pass through the rotating cylinder 1, which by fan action throws the gases into the lower spiral casing 7 surrounding the lower side of the cylinder. The spiral casing 7 merges into a diffuser 8 being directed upwards in which the kinetic energy of the gases is transformed into pressure energy.

The air is sucked in at 9, passes the space B, flows through the cylinder 1 and is thrown by the cylinder acting as a fan into the upper spiral casing 10 and the diffuser 11 being directed downwards in which the kinetic energy of the air is transformed into pressure energy. The apparatus will thus act both as a gas and as an air fan. At the same time the air will be preheated and the flue gas cooled. The heat transmission is effected by the cylinder which takes up heat while passing through the flue gas and gives off heat while passing through the air. The arrows indicate the direction of flow of the gas and air.

Having now particularly described the nature of my invention and the manner of its operation what I claim is:

1. In apparatus for regenerative heat exchanging between gases, comprising a housing and stationary partitioning means dividing the interior of said housing into two separate chambers, each communicating with an inlet port and an outlet port for one of the gases to be led through the respective chamber, the combination of a heat exchanger made from perforated sheet metal, having the shape of a drum and forming the regenerative mass of the apparatus, said heat exchanger being rotatably journalled in said housing opposite portions of said heat exchanger which with reference to its axis of rotation extend into said different chambers to separate the inlet port from the outlet port of each chamber, means for continuously rotating said heat exchanger to bring its different parts to pass successively through the two chambers in the housing, radially disposed passages for the gases being formed in the main peripheral portion of said rotary heat exchanger for the flow of gases from the inlet port to the outlet port of said chambers, said gas passages having a cross-section of such narrowness that a laminar flow tends to arise in such passages at undisturbed inlet, said passages having at the same time such a radial length that a state of turbulence generated in the flow by disturbances at the inlet of the rotating passages will be maintained during the flow of gas through the passages.

2. In apparatus for regenerative heat exchanging between gases, comprising a housing and stationary partitioning means dividing the interior of said housing into two separate chambers, each communicating with an inlet port and an outlet port for one of the gases to be led through the respective chamber, the combination of a heat exchanger having the shape of a drum and forming the regenerative mass of the apparatus, said heat exchanger being rotatably journalled in said housing opposite portions of said heat exchanger which with reference to its axis of rotation extend into said different chambers to separate the inlet port from the outlet port of each chamber, means for continuously rotating said heat exchanger to bring its different parts to pass successively through the two chambers in the housing, radially disposed passages for the gases being formed in the main peripheral portion of said rotary heat exchanger for the flow of gases from the inlet to the outlet of said chambers, said gas passages having a cross-section of such narrowness that a laminar flow tends to arise in such passages at undisturbed inlet, said passages having at the same time such a radial length that a state of turbulence generated in the flow by disturbances at the inlet of the rotating passages will be maintained during the flow of gas through the passages, said drum shaped rotary heat exchanger having a form effective to serve as a fan for propelling the heat exchanging media and being made for this purpose from perforated sheet metal, upon which material fan blades are bent out between the perforations on said rotary heat exchanger.

3. In apparatus for regenerative heat exchanging between gases, comprising a housing and stationary partitioning means dividing the interior of said housing into two separate chambers, each communicating with an inlet port and an outlet port for one of the gases to be led through the respective chamber, the combination of heat exchanger made from perforated sheet metal, having the shape of a drum and forming the regenerative mass of the apparatus, said heat exchanger being rotatably journalled at one end in said housing in a position effective to separate the inlet port from the outlet port of each chamber, means for continuously rotating said heat exchanger to bring its different parts to pass successively in direct contact with the two chambers in the housing, radially disposed short passages for the gases being formed in the main peripheral portion of said rotary heat exchanger for the flow of gases from the inlet port to the outlet port of said chambers, said gas passages having a cross-section of such narrowness that a laminar flow tends to arise in such passages at undisturbed inlet, said passages having at the same time such a very short radial length that a state of turbulence generated in the flow by disturbances at the inlet of the rotating passages will be maintained during the flow of gas through the passages.

4. In apparatus for regenerative heat exchanging between gases, comprising a housing and stationary partitioning means dividing the interior of said housing into two separate chambers, each communicating with an inlet port and an outlet port for one of the gases to be led through the respective chamber, the combination of a heat exchanger having the shape of a drum and forming the regenerative mass of the apparatus, said heat exchanger being rotatably journalled at one end in said housing in a position effective to separate the inlet port from the outlet port of each chamber, means for continuously rotating said heat exchanger to bring its different parts to pass successively in direct contact with the two chambers in the housing, radially disposed short passages for the gases being formed in the main peripheral portion of said rotary heat exchanger for the flow of gases from the inlet to the outlet of said chambers, said gas passages having a cross-section of such narrowness that a laminar flow tends to arise in such passages at undisturbed inlet, said passages having at the same time such a very short radial length that a state of turbulence generated in the flow by disturbances at the inlet of the rotating passages will be maintained during the flow of gas through the passages, said drum shaped rotary heat exchanger having a form effective to serve as a fan for propelling the heat exchanging media and being made for this purpose from perforated sheet metal, upon which material fan blades are bent out between the perforations on said rotary heat exchanger.

ERIK TORVALD LINDEROTH.